US Patent [19] Pope et al.

[11] 3,831,312
[45] Aug. 27, 1974

[54] FISH LURE
[75] Inventors: John E. Pope, Wilmington; Jack H. Main, Santa Monica, both of Calif.
[73] Assignee: Pope Manufacturing, Inc., Valencia, Calif.
[22] Filed: Mar. 24, 1972
[21] Appl. No.: 237,623

[52] U.S. Cl. ............................................. 43/42.17
[51] Int. Cl. ........................................ A01k 85/00
[58] Field of Search.............. 43/42.17, 42.19, 42.2, 43/42.23, 42.36

[56] References Cited
UNITED STATES PATENTS
2,785,496  3/1957  Menkens ........................... 43/42.19
3,555,717  1/1971  Gautsche, Jr. ..................... 43/42.19
3,680,247  8/1972  McKenzie .......................... 43/42.36

Primary Examiner—G. E. McNeill
Assistant Examiner—Gregory E. McNeill
Attorney, Agent, or Firm—Harris, Kern, Wallen & Tinsley

[57] ABSTRACT

A fish lure having one or more attractor elements movably attached on a sliding body such as a sinker. An attractor element is positioned on a mounting tube substantially coaxial with the sliding body for rotary, pivotal, and/or vibratory movement relative to the sliding body without interfering with the longitudinal motion of the sliding body along a fishing line.

6 Claims, 5 Drawing Figures

PATENTED AUG 27 1974　　　　　　　　　　　　3,831,312

FISH LURE

This invention relates generally to fish lures, and more particularly to a sliding body such as a sinker having attractor elements movably mounted thereon.

It is often desirable and necessary in both fresh and salt water fishing to attach sliding elements to a fishing line and leader. For example, sliding sinkers are employed to assure that a hook and its associated artificial and/or natural lures descend to a sufficient depth in the water, and are particularly useful in certain types of fishing because they allow the line and leader to pass freely therethrough, with only minimal unnatural drag, whenever a fish is mouthing and playing with the lures prior to "striking" or taking the hook. Other exemplary sliding elements are designed to be visually attractive to fish. However, conventional sliding bodies are not easily adaptable for carrying any moving attractor elements because of possible interference between the moving attractor elements and the sliding body and possible impairment of the slidability of the body along the fishing line. Many fishermen like as many moving attractor elements as possible including light reflective elements, or colored elements, or elements for agitating the line and associated lures, or elements for generating sonic impulses, or combinations thereof. Moving light-reflective blades are particularly useful to catch whatever light is available at deep water levels.

It is therefore a primary object of the invention to provide a sliding body having one or more attractor elements easily but securely attached thereto adjacent or between the ends of the body for movement separate and independent of the body, and without interfering with the sliding movement of the body along the fishing line.

A more specific object is to provide a fish lure having the aforementioned characteristic which provides a sliding body such as a sinker with a hollow longitudinal axis for receiving a fishing line, a mounting tube coaxial with the body and extending beyond one and/or both ends of the body, and one or more attractor elements movably mounted adjacent one or more of the body ends for rotary, pivotal and/or vibratory movement relative to and independent of the sliding body.

Further purposes, objects, features, and advantages of the invention will be evident to those skilled in the art from the following description of the various preferred embodiments of the invention.

Figure 1:
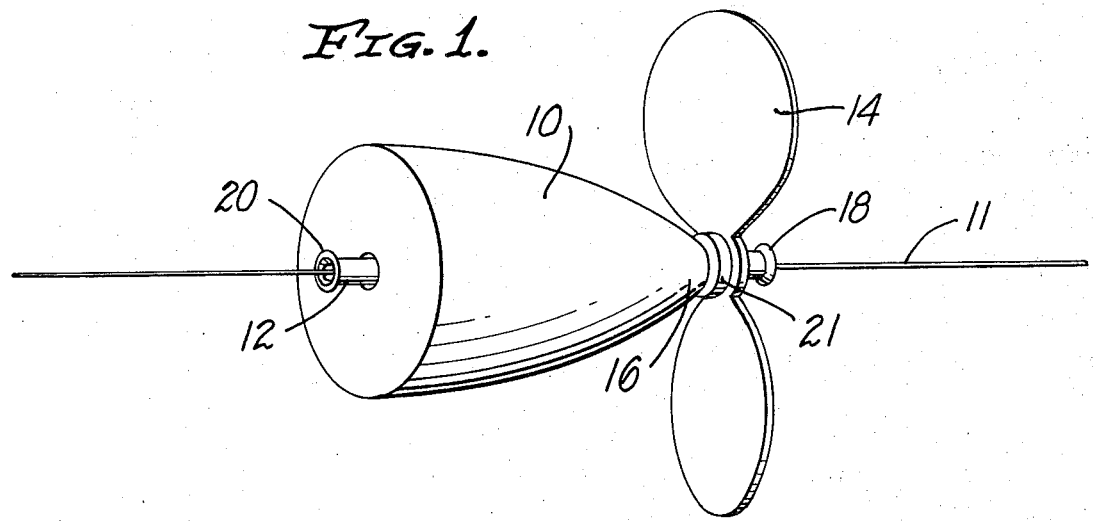
FIG. 1 is an isometric projection of one embodiment of the invention having an attractor blade mounted adjacent a forward end of a sliding body.

Generally speaking, the invention provides a body 10 having a hollow longitudinal axis for slidably receiving a fishing line 11. A mounting tube 12 coaxial with the body 10 extends beyond one and/or both ends of the sinker for movably mounting one or more attractor elements such as blades 14. The mounting tube 12 can be integral with the body 10 (see the embodiment of FIG. 5), or can be a separate member inside of the hollow longitudinal axis of the body 10 (see the embodiments of FIGS. 1 through 4).

The body 10 can be made of any suitable material, such as lead for a sliding sinker, or lighter material such as cork, wood, plastic, or the like, and one or more hooks can be suitably positioned on the body, if desired. The attractor elements 14 are not limited to the shapes and sizes shown in the illustrations, but can include any attractor element which rotates, vibrates, pivots, and/or otherwise moves independently when relative motion occurs between the body 10 and the surrounding water. Similarly, the invention contemplates all manner of attractor elements, including but not limited to light reflecting elements, colored elements, elements for imparting movement to the line and associated lures, and elements for generating sonic impulses. Furthermore, bodies 10 of diverse shapes can be used, in addition to the torpedo shape and egg shape shown in the drawing, so long as the periphery of the body does not extend into the desired movement paths of the blades 14. This elimination of undesirable interference between the moving blade and the body is facilitated by preferably attaching each blade on the mounting tube at or adjacent the forward and/or rearward end of the body, although in some instances a blade could also be movably attached intermediate the forward and rearward ends of the body. Non-interference between the moving blade and the fishing line 11 passing through the body 10 is further assured by using the outside surface of the mounting tube 12 as the bearing element and/or connecting link with the moving blade, thus leaving the axial passage inside the body and mounting tube clear and unimpaired notwithstanding the extent and frequency of movement of the blades 14.

Figure 2:
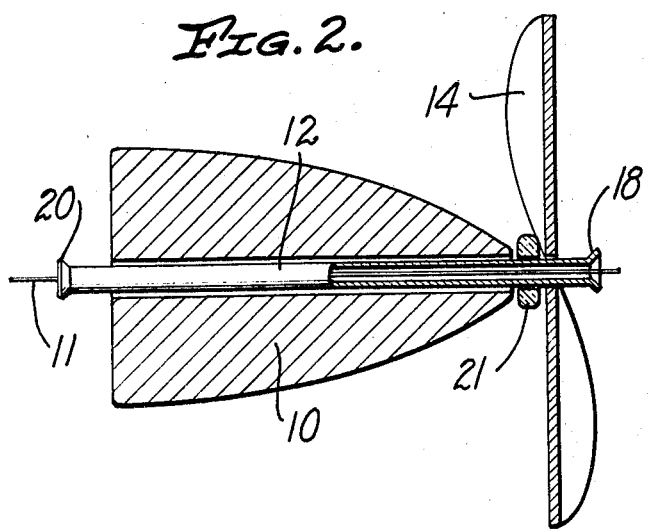
FIG. 2 is a side sectional view of FIG. 1.

Referring now to the embodiment of FIGS. 1 and 2, the body 10 tapers at its forward end 16 in the direction of the fishing pole and includes a hollow cylindrical passage through its longitudinal axis. The mounting tube 12 is hollow and sized to fit inside of and coaxial with the body 10 and is of sufficient length to extend beyond the forward end 16 of the body to provide a circular bearing surface for rotatably mounting an examplary two-lobe airplane propellor blade. Forward and rearward flanges 18, 20 project outwardly at the ends of the mounting tube 12 and serve as stop-elements to retain the body 10 and the blade 14 in operative position on the mounting tube 12. Where necessary, movement of the blade 14 against forward and rearward contact surfaces on the body 10 or flanges 18, 20 can be facilitated by a bearing member such as a decorative bead 21 on the mounting tube 12. In some instances, the body 10 is subject to slippage along the mounting tube 12 to facilitate mounting attractor elements on one or both ends of the mounting tube. However, the body may be fixedly attached to the mounting tube as by force fit, adhesive or welding to eliminate the need for a stop element on the end of the mounting tube 12 having no blade 14. Such fixed attachment would also eliminate any drag or damping resulting from the body 10 slipping against a rearwardly mounted blade, as shown in FIGS. 3 and 4.

Figure 3:
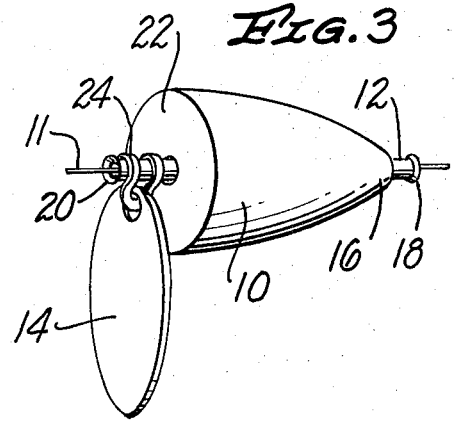
FIG. 3 is another embodiment having a different type of attractor blade mounted adjacent a rearward end of a sliding body.

The embodiment of FIG. 3 provides an attractor blade 14 movably attached on the mounting tube 12 adjacent a truncated end 22 of the body 10 in the direction away from the fishing pole. The exemplary attractor blade here has a single lobe and can be pivotally mounted directly on the mounting tube 12 itself or attached to a clevis 24 on the outer circular bearing surface of the mounting tube. When the body 10 is moving forwardly relative to the surrounding water, the blade at the rear of the body can agitate or spin in a large space adjacent the body without bumping the body or interfering with the passage of the fish line 11 therethrough.

Figure 4:
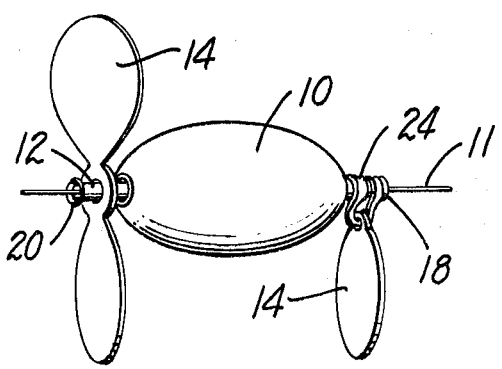
FIG. 4 is another embodiment having different types of attractor blades mounted adjacent opposite ends of a differently shaped sliding body.

In the embodiment of FIG. 4, the mounting tube 12 extends beyond both ends of a double tapered body 10 to carry rearward and forward blades 14, respectively.

Figure 5:
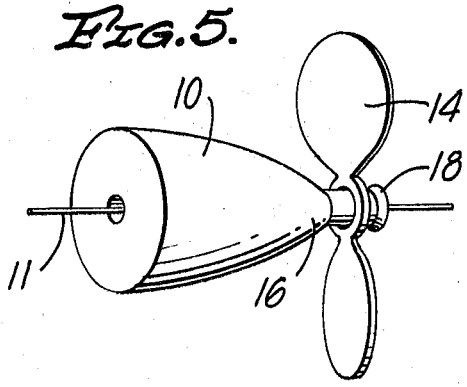
FIG. 5 shows a different form of the lure of FIG. 1 with an attractor blade mounted directly on a forward end of a sliding body.

The embodiment of FIG. 5 provides a mounting tube 12 integral with and extending longitudinally out from the forward end 16 of the body 10 to movably mount the rotary blade 14 on a circular bearing surface behind the forward flange 18. This structure has the advantage of a fixed tube-body connection while eliminating the need for a separate mounting tube 12 extending the full length of the body 10. Minor variations of this structure would also enable attachment of a blade 14 between and displaced from the ends of the body 10.

It will be appreciated by those skilled in the art that the foregoing structure enables a sliding body to have attractor elements movably attached thereto without interfering with or being unduly damped by the sliding body. More specifically, the structure disclosed herein enables a sliding sinker to serve as an attraction for fish as well as a weight for controlling the depth of the fishing line and its hooks in the water.

Although exemplary embodiments of the invention have been disclosed herein for purposes of illustration, it will be understood that various changes, modifications, and substitutions may be incorporated in such embodiments without departing from the spirit of the invention as defined by the claims which follow.

We claim:

1. A fish lure for use on a fishing line including in combination:

an attractor element responsive to the relative movement of water surrounding the lure;

a unitary solid body having a high density sufficient to sink in water and having both large cross-sectional and large longitudinal-sectional areas as compared to the cross-sectional area of the fishing line for slidably receiving the fishing line therethrough to sink said fishing line and any hooks attached thereto to a position substantially below the surface of the water; said solid body including a longitudinal passage, and mounting tube means coaxial with said longitudinal passage and positioned therein for slidably receiving the fishing line, said mounting tube means having said attractor element attached thereto and in a position immediately next to an end of said solid body, said mounting tube means holding said attractor element and said solid body together when said solid body moves either forwardly and rearwardly in a longitudinal direction on said fishing line while allowing said attractor element to move relative to said solid body and responsive to the relative movement of water past said solid body without unpairing the slidability of said fishing line through said solid body.

2. The fish lure of claim 1 including an attractor element having a rotatable blade member and wherein said end of said solid body adjacent said mounting tube means has a diminishing cross-sectional area to prevent contact between said rotatable blade member and said solid body and to provide a path for relative movement of water against said rotatable blade member.

3. The fish lure of claim 1 wherein said body has one end which is laterally truncated.

4. The fish lure of claim 1 including mounting tube means longitudinally movable relative to said body and having sufficient length to extend beyond either end of said body for movably attaching an attractor element adjacent either end of said body.

5. The fish lure of claim 1 wherein said mounting tube means includes a bearing element positioned between said attractor element and said solid body.

6. The fish lure of claim 1 wherein said attractor element includes a plurality of attractor elements, and said mounting tube means includes means on opposite ends of said solid body for movably attaching at least one of said plurality of attractor elements at each end of said solid body.

* * * * *